L

United States Patent [19]
Indoe

[11] Patent Number: 5,747,738
[45] Date of Patent: May 5, 1998

[54] METHOD OF APPLYING WALL COVERING TO A PLATE COVER

[76] Inventor: Terry E. Indoe, 6714 Center Rd., Valley City, Ohio 44280

[21] Appl. No.: 835,856

[22] Filed: Apr. 8, 1997

[51] Int. Cl.[6] .................................................. H05K 5/03
[52] U.S. Cl. ........................... 174/66; 156/71; 156/289; 33/528; 33/DIG. 10
[58] Field of Search ........................... 174/66; 220/3.8, 220/241; 33/528, DIG. 10, 562; 156/71, 289, 247, 249

[56] References Cited

U.S. PATENT DOCUMENTS

| | | | |
|---|---|---|---|
| 3,607,540 | 9/1971 | Hoogstoel | 156/289 |
| 3,969,564 | 7/1976 | Carder | 428/212 |
| 4,201,359 | 5/1980 | Baslow | 248/345.1 |
| 4,268,566 | 5/1981 | Ebert | 428/195 |
| 4,353,759 | 10/1982 | Stallings | 174/66 X |
| 4,372,050 | 2/1983 | Eisenhauer | 33/DIG. 10 X |
| 4,625,490 | 12/1986 | Baslow | 52/716 |
| 4,702,948 | 10/1987 | Sieber-Gadient | 428/41.9 |
| 4,782,883 | 11/1988 | Braiotta | 160/368.1 |
| 4,894,274 | 1/1990 | Graham et al. | 428/151 |
| 5,238,271 | 8/1993 | Nirmel | 283/67 |
| 5,240,287 | 8/1993 | Nirmel | 283/101 |
| 5,321,206 | 6/1994 | Hibler | 33/DIG. 10 X |
| 5,476,559 | 12/1995 | Chiro | 156/71 |
| 5,482,755 | 1/1996 | Manning | 428/95 |
| 5,486,394 | 1/1996 | Stough | 428/61 |
| 5,487,929 | 1/1996 | Rusincovitch et al. | 428/40.9 |
| 5,491,902 | 2/1996 | Uhrin et al. | 33/DIG. 10 X |

Primary Examiner—Kristine L. Kincaid
Assistant Examiner—Dean A. Reichard
Attorney, Agent, or Firm—Jones, Day, Reavis & Pogue

[57] ABSTRACT

A simple, efficient and inexpensive method for applying non self-adhesive wall coverings to smooth, non-porous objects, such as electric, TV/cable or air vent plate covers employs a two-sided contact adhesive sheet. A portion of one side of the adhesive sheet is adhered to the plate cover with adhesive revealed by the removal of a pre-perforated section of a release sheet. A piece of wall covering is adhered to a portion of the other side of the adhesive sheet with adhesive revealed by the removal of a pre-perforated section of a second release sheet. The remainder of the two release sheets are removed and the remainder of the adhesive sheet and wall covering are adhered to the plate cover. The method facilitates the matching of a patterned piece of wall covering to the pattern of wall covering on a wall.

10 Claims, 5 Drawing Sheets

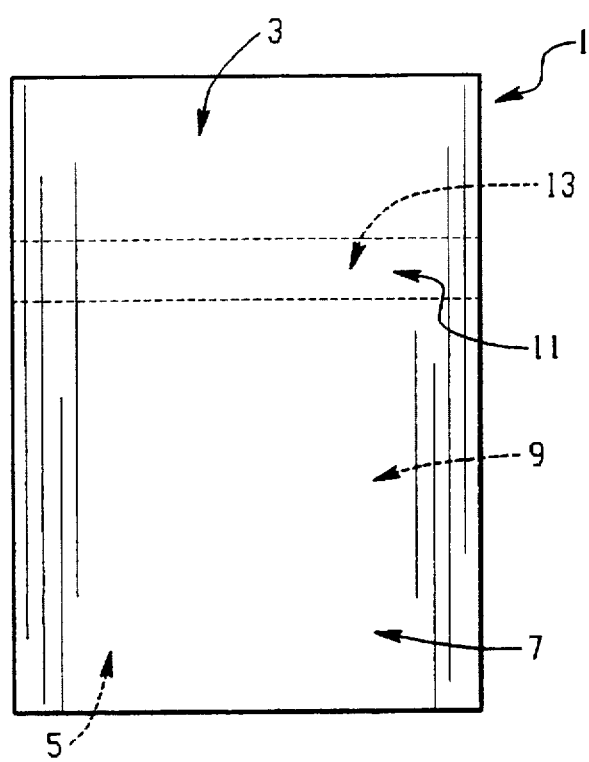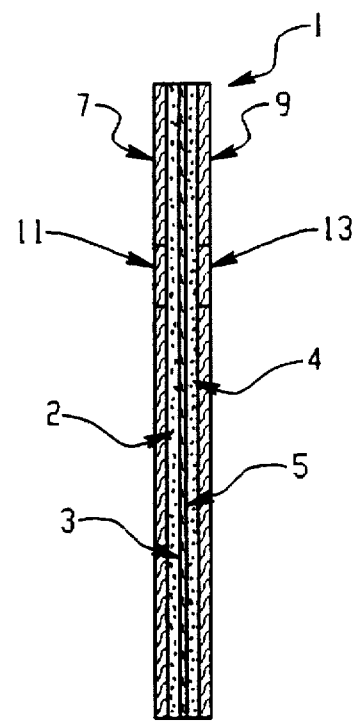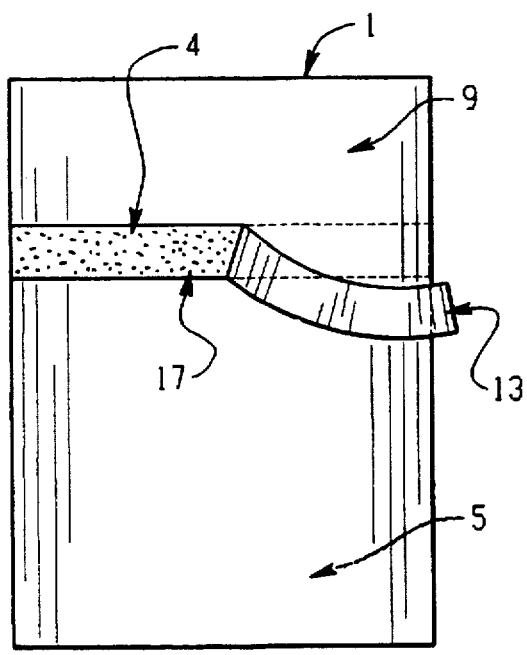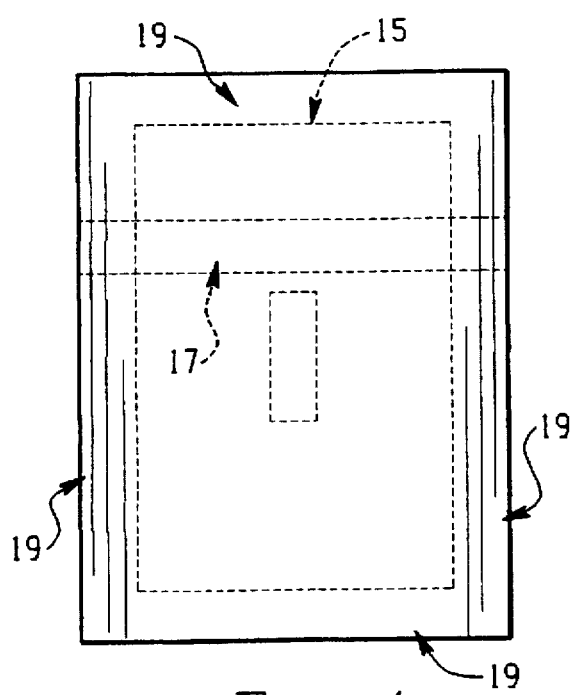
Fig. 1
Fig. 2
Fig. 3
Fig. 4

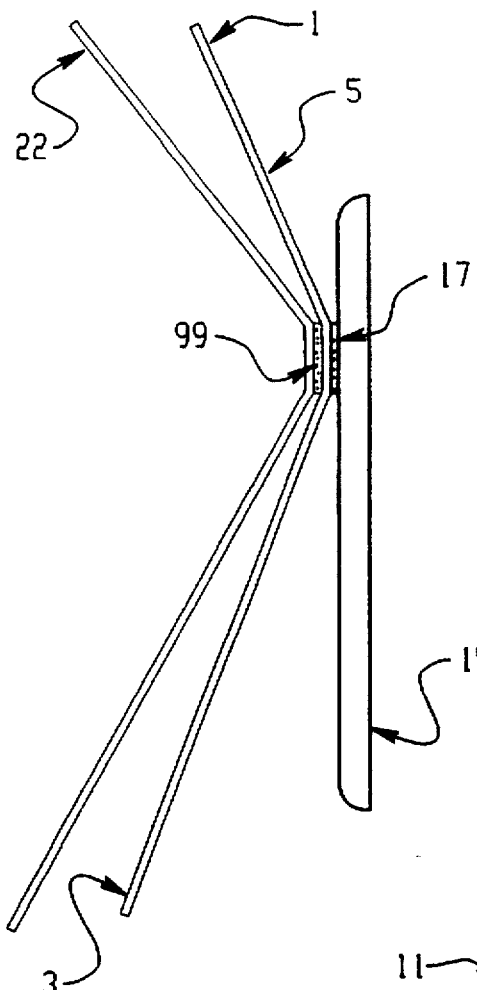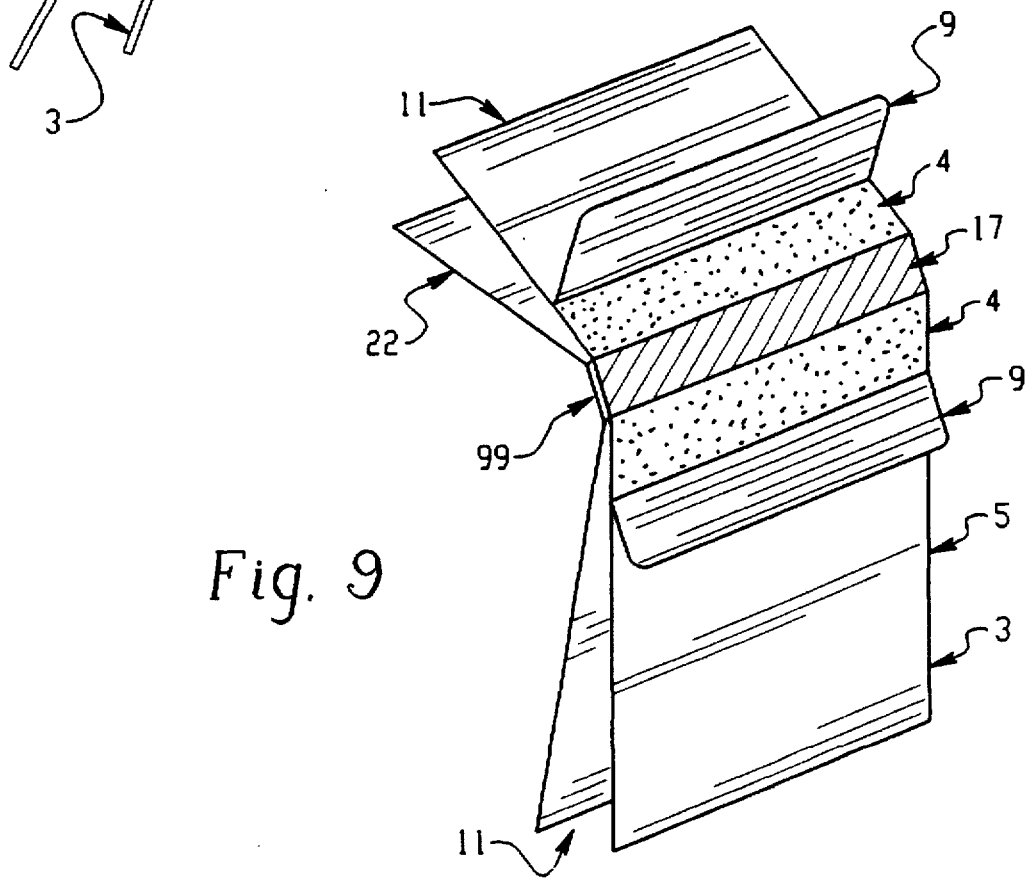

' 5,747,738

METHOD OF APPLYING WALL COVERING TO A PLATE COVER

BACKGROUND OF THE INVENTION

When installing wall covering of any type, small irregular raised objects, such as electrical outlet plate covers and switch plate covers, television/cable box plate covers, air vent covers and the like, are frequently encountered. For aesthetic purposes, it is often desirable to cover these plate covers with a separate piece of the wall covering. Because plate covers are typically smooth and non-porous, usually being made of plastic, metal or ceramic, the pastes normally used for attaching wall coverings to walls do not adhere well to the plate covers and are slippery, such that the movement of the wall covering on the plate cover is not easily controllable and often results in wrinkling or tearing of the wall covering or mismatching of patterns. Moreover, only a limited period of time is available for adjustment before the adhesive sets or dries.

Another problem that arises when attempting to apply wall covering to plate covers is that the portions of the wall covering that are wrapped around the edges of the plate covers do not adhere adequately because of the small surface area available for the adhesive on the edges and back of the plate cover. These wrap-around portions frequently do not stick to the plate cover, even if held in place until the adhesive sets, for example by masking tape. Thus, positioning and adhering a piece of wall covering on a small plate cover, particularly when matching the pattern of the wall covering on the wall, can be very time consuming and expensive.

Several systems that do not employ user-applied or wetted liquid adhesives have been described for applying wall coverings to walls. For example, wall covering sheets with pressure-sensitive adhesive backings have been described. However, this type of wall covering generally relies on high initial tack or cure time for quick adhesion such that the wall covering is adhered quickly to the wall and cannot be easily adjusted for matching of patterns. Other systems allegedly allow for repositioning of such self-adhesive wall coverings on walls. For example, protruding projections that act as spacers between the adhesive and the wall may prevent full contact between the wall and the adhesive until the sheet has been slidably repositioned. Such systems may employ non-adherent materials embedded within the adhesive or patterns or ribs of non-adherent material between the areas of adhesive. Alternatively, the adhesive may be present in hollow protrusions on the backing. Other systems employ microspheres containing the adhesives and a thin film of adhesive covering the microspheres to allegedly allow repositioning before applying pressure to break the microspheres and permit more adhesive contact.

Each of the described systems, however, provides only a limited time period in which to accurately position the wall covering to match a pattern before the adhesive cures. Moreover, when covering relatively small objects, such as plate covers, the presence of non-adhesive spacers between adhesive areas on the wall covering may not provide a sufficient amount of adhesive to provide adherence of the wall covering, especially in the wrap-around portions. In addition, wall coverings with any type of pressure-sensitive adhesive backings are expensive compared with paper, vinyl or fabric backed wall coverings that are attached with user-applied liquid wallpaper adhesives.

A known system for applying a wall covering to an outlet plate cover employs a clear plastic cover with a metal backing. A piece of wall covering is cut and inserted between the plastic cover and the metal backing, and the assembly is then secured with screws. An advantage to this method is that the piece of wall covering is not adhered to the plastic cover or the backing and can be easily changed or substituted with another wall covering. The disadvantages of this system, however, are that it is expensive and it is difficult and time consuming to match the pattern with the pattern of a wall covering on the wall.

There is a need, therefore, for a simple and inexpensive method of applying non self-adhesive wall coverings, especially patterned wall coverings, to small non-porous objects, such as plate covers.

SUMMARY OF THE INVENTION

The invention provides a simple, efficient and inexpensive method for applying non self-adhesive wall coverings to smooth, non-porous objects, such as electric, TV/cable or air vent plate covers. Although the invention is described hereinafter with reference to applying wall covering to plate covers, the method may also be used to apply non self-adhesive wall coverings to non-porous irregular objects, such as curtain rods, valences, waste baskets, lamp shades, and the like. The terms "outlet" and "outlet plate cover", as used in this invention, are intended to encompass any type of plate cover, such as those made of plastic, metal or ceramic, that may be attached to a surface, such as a wall, to cover an opening for an electrical or other outlet. The method is particularly useful for quickly and economically matching the pattern of the wall covering to be applied to the plate cover with a patterned wall covering on a wall.

In an embodiment of the method of the invention, a two-sided adhesive sheet, having a tacky, preferably permanent, contact adhesive on each of the sides is provided. The first and second sides of the adhesive sheet are covered with first and second release sheets, each having a removable pre-perforated section. Preferably, each release sheet is made of a material that is flexible and easily removable from the adhesive sheet, such as paper, waxed paper, or polyvinyl chloride, polyethylene or polyester film.

The steps of the method comprise removing the pre-perforated section from the first release sheet to reveal adhesive; adhering the first side of the adhesive sheet to an outlet plate cover; removing the pre-perforated section from the second release sheet to reveal adhesive; adhering a piece of wall covering to the second side of the adhesive sheet; removing the remainder of the first release sheet; adhering a remainder of the first side of the adhesive sheet to the face of the outlet plate cover; removing the remainder of the second release sheet; and adhering a remainder of the piece of wall covering to the remainder of the second side of the adhesive sheet.

In a preferred embodiment of the method, matching the pattern of the piece of wall covering with the pattern of the wall covering of the wall is facilitated by loosely positioning the plate cover on the outlet prior to adhering the wall covering to the adhesive revealed by removing the pre-perforated section from the second side of the adhesive sheet. When the match is achieved and the wall covering is adhered, the plate cover is removed from the outlet prior to adhering the remainder of the adhesive sheet to the plate cover and wall covering.

Preferably, the adhesive sheet and the piece of wall covering are of a size sufficient to cover at least the face of the plate cover. More preferably, both the adhesive sheet and the piece of wall covering are of a size larger than the face of plate cover and sufficient to provide a wrap-around allowance margin. In this embodiment, the method further comprises the steps of wrapping the allowance margin around the edges of the plate cover and adhering the adhesive sheet and the wall covering to the edges and back of the plate cover prior to securing the plate cover to the wall.

The method of the invention may be used for any type of plate cover, such as those covering a plurality of outlets, switches, etc. Preferably, the adhesive sheet is supplied in a roll and can be cut to size to fit virtually any plate cover.

BRIEF DESCRIPTION OF THE DRAWINGS

FIG. 1 illustrates a double-sided contact adhesive sheet having a release sheet with a pre-perforated section covering the adhesive.

FIG. 2 is a cross-section of the double-sided adhesive sheet of FIG. 1.

FIG. 3 illustrates removal of the pre-perforated section to reveal an underlying adhesive section.

FIG. 4 illustrates the adherence of the revealed adhesive section to a plate cover.

FIG. 8 is a cross section of the plate cover with the adhered adhesive sheet and wall covering piece.

FIG. 9 illustrates removal of the remainder of the release sheets from the adhesive sheet (wall covering and plate cover not shown).

DETAILED DESCRIPTION OF THE INVENTION

Figure 5:
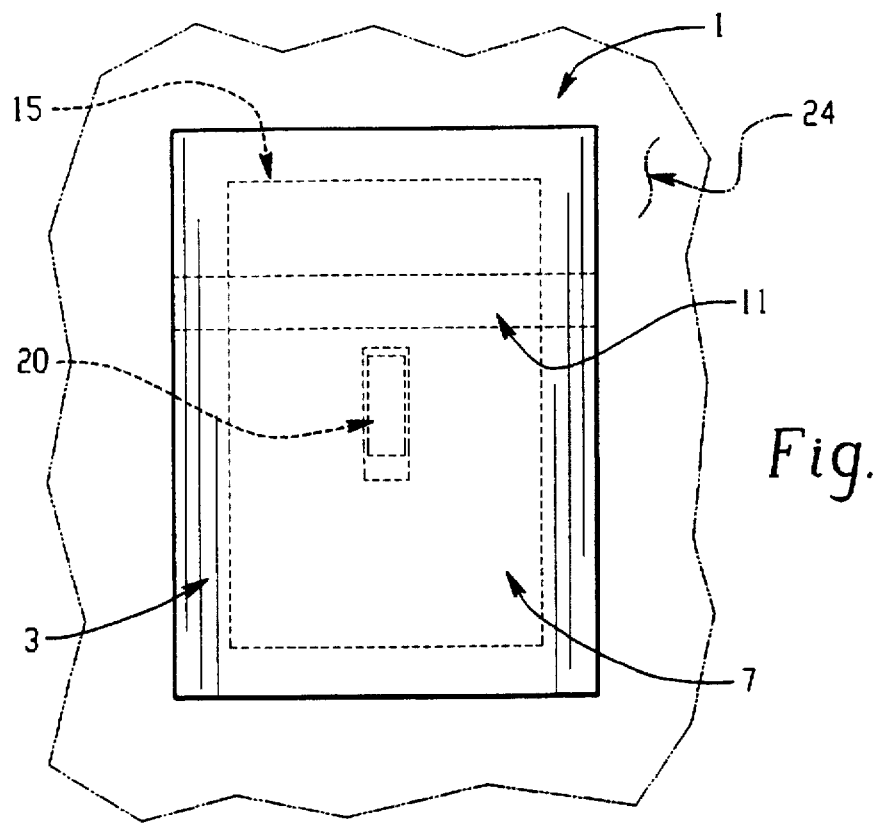
FIG. 5 illustrates a loose attachment of the plate cover of FIG. 4 over an outlet.

An embodiment of the method of the invention is best described with reference to the Figures. FIGS. 1 and 2 illustrate a double-sided contact adhesive sheet 1. The adhesive 2 and 4 on each of the sides 3 and 5 of the adhesive sheet is covered with release sheets 7 and 9, each of which has at least one pre-perforated section 11 or 13. The size of the pre-perforated sections on the release sheets is sufficient such that their removal reveals sufficient adhesive to adhere the adhesive sheet to the plate cover and the wall covering to the adhesive sheet, as described further below. The release sheets are preferably made of a material that is flexible and easily removable from the adhesive sheet, such as paper, waxed paper, or polyvinyl chloride, polyethylene or polyester film.

Figure 6:
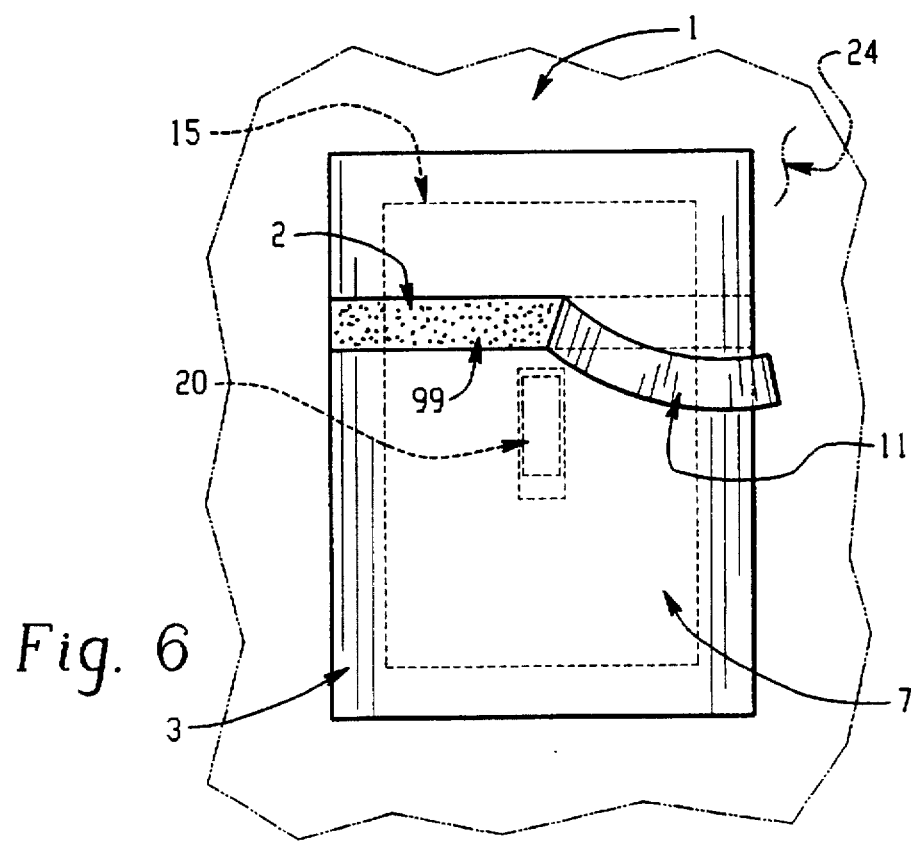
FIG. 6 illustrates removal of the second pre-perforated section to reveal a second underlying adhesive section.
Figure 7:
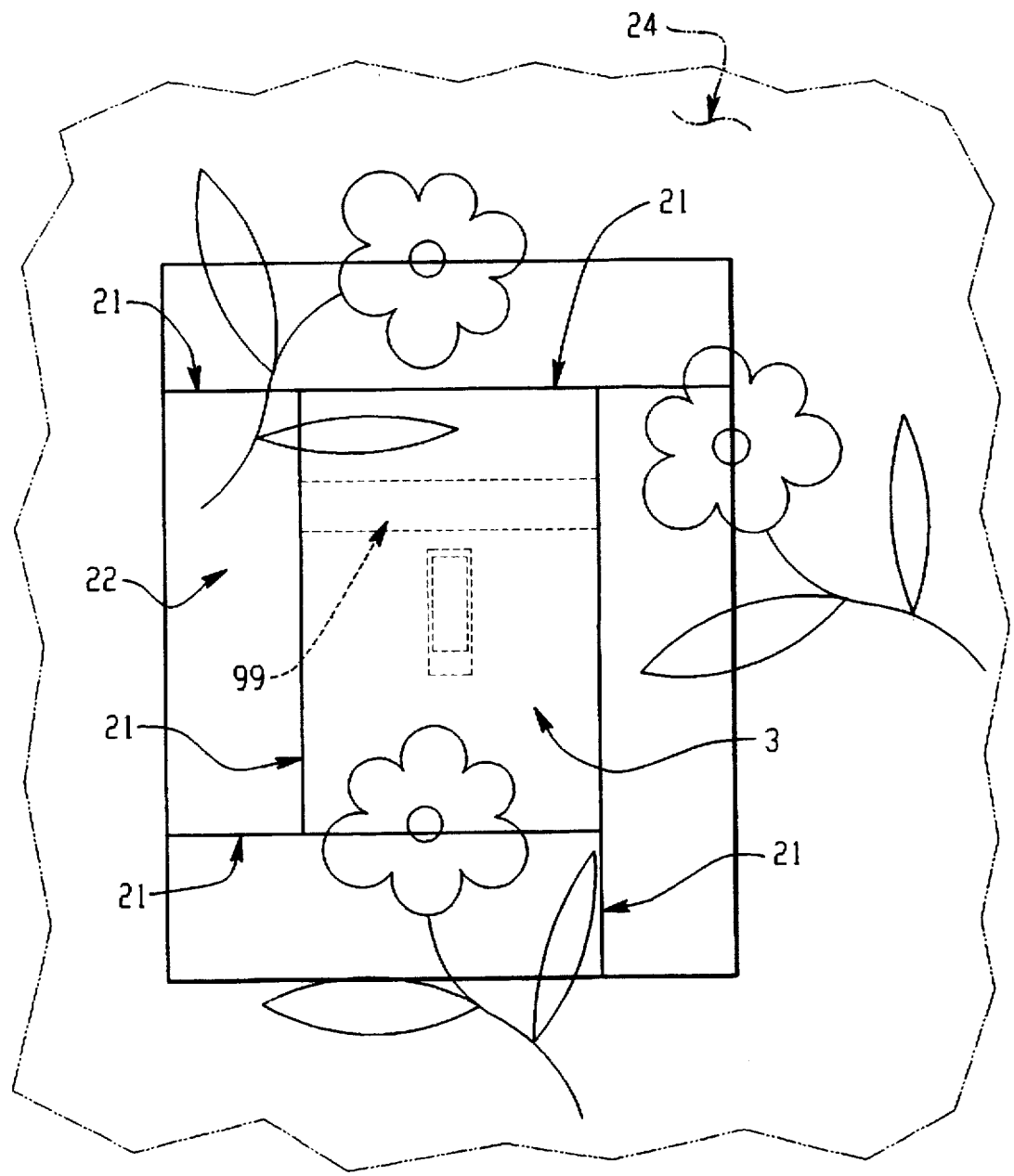
FIG. 7 illustrates matching of a piece of wall covering to the pattern of a wall covering on the wall and adhering of the wall covering to the adhesive revealed by removal of the second pre-perforated section from the adhesive sheet.
Figure 10:
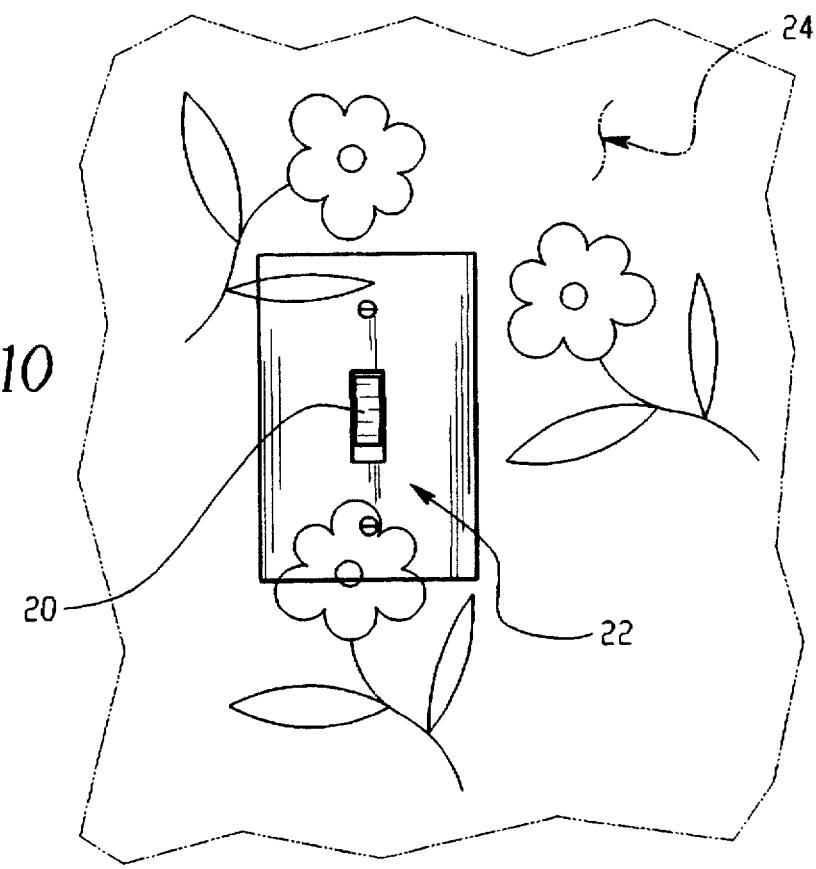
FIG. 10 illustrates the plate cover secured to the wall, with the pattern of the wall covering matched and the adhesive sheet with attached wall covering wrapped around the edges of the plate cover.
Figure 11:
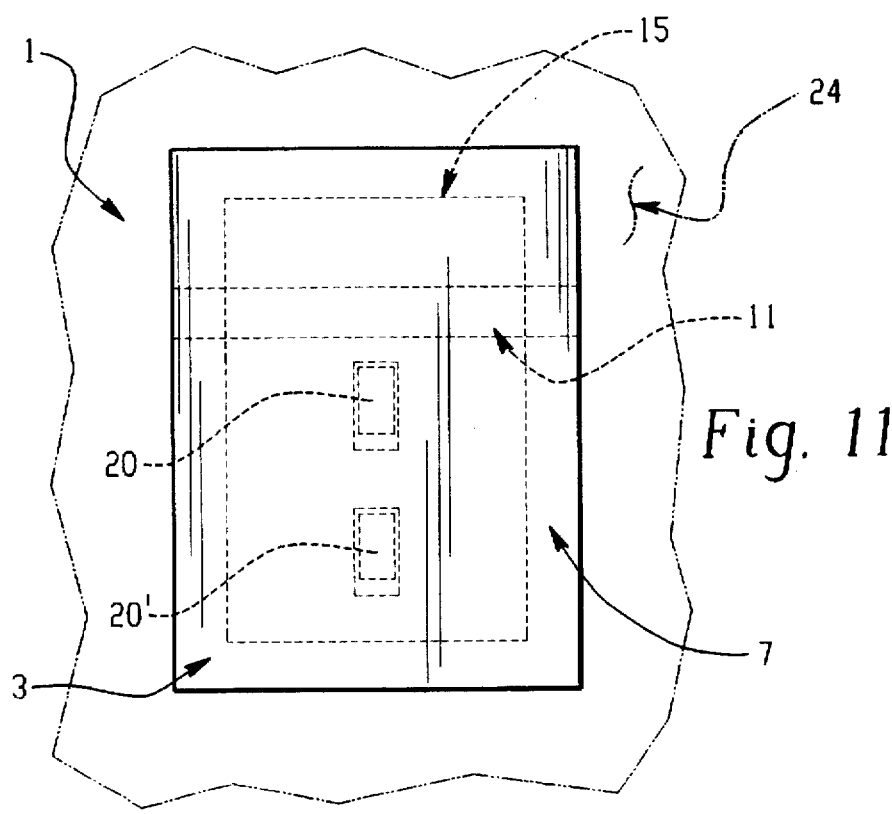
FIG. 11 illustrates a loose attachment of the plate cover of FIG. 4 over a plurality of outlets.

The first step in the method, as illustrated in FIG. 3 is to remove the pre-perforated section 13 from release sheet 9 to expose the underlying adhesive 4 on a section 17 of side 5 of the adhesive sheet 1. As illustrated in FIG. 4, the adhesive sheet 1 is then applied to and pressed firmly to adhere the sheet to a plate cover 15 at adhesive section 17, while preferably providing a sufficient margin 19 on all sides to allow for later wrapping around the plate cover 15. If the plate cover is to be secured to a wall 24 having a wall covering with a pattern (not shown), the plate cover 15 is then optionally loosely positioned over its respective outlet, switch or the like 20 (FIG. 5), in order to allow matching of the patterns. FIG. 11 shows a plate cover 15 positioned over a plurality of outlets, switches, or the like 20'. As illustrated in FIGS. 6 and 7, the pre-perforated section 11 is then removed from the second release sheet 7 to reveal the underlying adhesive 2, a wall covering section 22 having a pattern matching the pattern on the wall 24 is properly aligned to match that pattern prior to pressing it firmly for adherence to the second side of the adhesive sheet 3 at revealed adhesive section 99. The plate cover 15 is then removed from its respective outlet 20. The section of wall covering 22 is trimmed to match the size of the adhesive sheet 1, as shown at 21. As illustrated in FIG. 8, the adhesive sheet 1 is now adhered at section 17 on side 5 to the plate cover 15 and the properly aligned wall covering section 22 is adhered to the adhesive sheet at section 99 on side 3. The remainder of release sheet 9 is then removed from adhesive sheet 1 (FIG. 9) to expose the adhesive 4, and side 5 of the adhesive sheet is pressed firmly to adhere to the face of the plate cover (not shown in FIG. 9 for purposes of clarity). The remainder of release sheet 11 is then removed from adhesive sheet 1 to expose the adhesive 2, and wall covering section 22 is pressed firmly to adhere to the remainder of side 3 of the adhesive sheet 1. The edges 19 of the adhesive sheet are then wrapped around the edges of the plate cover and pressed firmly to adhere the adhesive sheet and wall covering to the edges and back of the plate cover. Openings are cut for the plug, switch, or other outlet hardware, such as with a razor blade, and screw holes are punched in the paper by known methods. As illustrated in FIG. 10, the plate cover 15, now covered with wall covering 22, is replaced on the wall 24 and secured in place.

The method of the invention may be used with any plate cover, such as those made of plastic, metal or ceramic, that is applied to a wall or other surface. The contact adhesive underlying the pre-perforated sections of the release sheet may be a releasable adhesive or a non-releasable adhesive, but if it is a releasable adhesive, it is preferably sufficiently tacky to hold the adhesive sheet and/or the wall covering in place on the plate cover 15 while the plate cover is being manipulated. Preferably, the contact adhesive on both sides of the adhesive sheet, including that which is under the pre-perforated sections, is a non-releasable, permanent adhesive, and more preferably, a rubber-based or acrylic adhesive. Suitable permanent adhesives for use on the two-sided adhesive sheet are Rubber R-40 (Product Number 9443) and Acrylic A-40 (Product Number 415) manufactured by 3M Company, Minneapolis, Minn.

The pre-perforated sections may be of any size, shape and at any position on the adhesive sheet such that, when applied to the plate cover, they do not cover any access openings for protrusions through the plate cover when it is applied to the outlet. Preferably, at least one of the pre-perforated sections is a transverse horizontal or vertical strip. When used for a typical plate cover, such as those covering electrical outlets or switches, TV/cable outlets, etc., the strip has a diameter of about ¼ inch to about 1½ inch, preferably about ½ inch.

The double-sided adhesive sheet is preferably supplied in a continuous roll, with the perforated section running the length of the roll, such that the sheet may be cut to size to fit virtually any size plate cover. Thus, the method of the invention is particularly useful for applying wall covering to outlet plate covers that cover a plurality of outlets. Optionally, the roll may be supplied in standard widths for outlet plate cover applications.

The method of the invention may be used with any non self-adhesive wall covering including paper, vinyl, and woven and non-woven fabric-backed wall covering. The wall covering may be formed typically of paper, plastic, metal foil or fabric material, and may have a pattern or design printed or embossed on the front surface.

Although double-sided self-adhesive tapes have been previously described for application of full-area carpeting of floors and covering of walls, the use of a pre-perforated portion of a release sheet has not been described for applying wall covering, particularly patterned wall covering, to small objects, such as plate covers. Compared to other methods of applying wall coverings to outlet plate covers, the method of the invention is simple, inexpensive, and can achieve a virtually perfect match of patterns in wall coverings in just seconds.

While the invention has been described herein with reference to the preferred embodiments, it is to be understood that it is not intended to limit the invention to the specific forms disclosed. On the contrary, it is intended to cover all modifications and alterative forms falling within the spirit and scope of the invention.

I claim:

1. A method of applying non self-adhesive wall covering to an outlet plate cover, comprising the steps of:
    a) providing
        (I) an outlet plate cover having a face, a back, and outer edges,
        (ii) a piece of non self-adhesive wall covering of a size sufficient to cover at least the face of the outlet plate cover,
        (iii) an adhesive sheet of a size sufficient to cover at least the face of the outlet plate cover and having first and second sides, said sheet having a contact adhesive on each of the first and second sides,
        (iv) a first and a second release sheet covering the adhesive on the first and second sides, respectively, of the adhesive sheet, each of the release sheets having a pre-perforated section,
    b) removing the pre-perforated section from the first release sheet to reveal adhesive;
    c) adhering the first side of the adhesive sheet to the face of the outlet plate cover;
    d) removing the pre-perforated section from the second release sheet to reveal adhesive;
    e) adhering the piece of wall covering to the second side of the adhesive sheet;
    f) removing a remainder of the first release sheet;
    g) adhering a remainder of the first side of the adhesive sheet to the face of the outlet plate cover;
    h) removing a remainder of the second release sheet; and
    I) adhering a remainder of the piece of wall covering to a remainder of the second side of the adhesive sheet.

2. The method according to claim 1, wherein the piece of wall covering and the adhesive sheet are of a size sufficient to provide a wrap-around allowance margin around the outer edges of the outlet plate cover, and the method further comprises the step of wrapping the allowance margin around the edges of the plate cover and adhering the adhesive sheet and the wall covering to the outer edges and the back of the outlet plate cover.

3. The method according to claim 1, wherein the piece of wall covering has a pattern and the method further comprises the steps of:
    providing a patterned wall covering on a wall, wherein the pattern on the piece of wall covering matches the patterned wall covering on the wall;
    loosely positioning the outlet plate cover on an outlet prior to step (d);
    matching the pattern of the piece of wall covering to the pattern of the wall covering on the wall prior to step (e); and
    removing the loosely positioned plate cover from the outlet prior to step (f).

4. The method according to claim 1, wherein the contact adhesive is a permanent adhesive.

5. The method according to claim 4, wherein the contact adhesive is a rubber-based adhesive.

6. The method according to claim 4, wherein the contact adhesive is an acrylic-based adhesive.

7. The method according to claim 1, wherein each pre-perforated section is an elongated strip having a width of about ¼ inch to about 1½ inch.

8. The method according to claim 7, wherein each pre-perforated section has a width of about ½ inch.

9. The method according to claim 1, wherein the outlet plate cover covers a plurality of outlets.

10. The method according to claim 1, wherein each of the first and second release sheets are selected from the group consisting of paper, waxed paper, polyvinyl chloride film, polyethylene film and polyester film.

* * * * *